INVENTOR.
DONALD L. BISE
BY Moody and Phillion
ATTORNEYS

INVENTOR.
DONALD L. BISE
BY
Moody and Phillion
ATTORNEYS

INVENTOR.
DONALD L. BISE
BY
Moody and Phillips
ATTORNEYS

INVENTOR.
DONALD L. BISE
BY
Moody and Phillion
ATTORNEYS

United States Patent Office 3,440,572
Patented Apr. 22, 1969

3,440,572
MECHANICAL FILTER SECTION WITH ENVELOPE DELAY COMPENSATION CHARACTERISTIC
Donald L. Bise, Costa Mesa, Calif., assignor to Collins Radio Company, Cedar Rapids, Iowa, a corporation of Iowa
Filed May 27, 1966, Ser. No. 553,520
Int. Cl. H03h 7/30
U.S. Cl. 333—30 13 Claims This invention relates generally to mechanical filters of the stacked disc type and, more particularly, to a mechanical filter structure which has a group delay characteristic complementary to that of a conventional mechanical filter so that when the filter section of the present invention is combined with a section of a standard conventional mechanical filter, the resultant group delay has a more constant characteristic.

Because of their superior frequency cutoff characteristics, mechanical filters today enjoy a rather wide spread usage in high-quality electronic gear. The most widely used type mechanical filters are comprised of a plurality of discs stacked concentrically, one upon the other, and spaced apart a predetermined distance. The discs are held in such position by means of coupling wires which extend along the side of the stack of discs and are secured to the perimeter of the discs. Vibration of the discs is in the circular mode; i.e., the action of the discs is something like the bottom of an oil can, with the node being circular and concentric around the axis of the disc. One of the operating characteristics of prior art mechanical filters which, in some applications is a disadvantage, is a large degree of variation in group delay. Group delay is defined as the rate of change of phase with respect to frequency over the passband and is, in effect, the slope of the phase characteristic. More specifically, group delay is defined as $d\theta/d$, where $\theta$ is equal to the phase shift at a given frequency. Worded differently, if the group delay is the same at each frequency, the phase relationship between various frequency components is a linear one. Such a condition would meet the requirements of constant group delay or linear phase shift.

In most prior art mechanical filters of the stacked disc type, the group delay characteristic over the passband is generally as follows. At the lower end of the passband the delay, in terms of time, is large and decreases towards the center of the passband. Near the center of the passband, the delay is smallest and then begins to increase as the upper edge of the passband is approached. Thus the overall group delay response curve is U-shaped, with time plotted along the Y axis and frequency along the X axis.

The primary object of the present invention is to provide a mechanical filter of the stacked disc type having a group delay which is complementary to that of a conventional mechanical filter section; i.e., has a shape somewhat similar to that of an inverted U.

A second object of the invention is a mechanical filter section having a group delay characteristic which is substantially complementary to the group delay characteristic of a conventional mechanical filter section to produce an overall group delay characteristic which is substantially constant in the passband region.

A third purpose of the invention is a mechanical filter having a substantially constant group delay characteristic.

A fourth purpose of the invention is the improvement, generally, of mechanical filters having constant group delay characteristics.

In accordance with the invention, at least four circular mode discs are stacked in a concentric manner, one upon the other, but with a spacing therebetween, and held in such relative positions by coupling wires securely attached to the perimeters of each disc. The two center discs are segmented; that is, the portion of the perimeters of the two center discs is ground to a flat surface to permit additional coupling wires, hereinafter known as bridging wires, to extend from the first disc to the fourth disc, passing over the segmented portions of the two center discs so that the two center discs are not touched by the bridging wires.

By proper tuning of the discs, as discussed in detail later herein, such a structure produces a group delay characteristic which has, generally, an inverted U shape and which is complementary to the group delay of a conventional filter section. By combining the mechanical filter section in the present invention with a conventional mechanical filter section, a substantially constant group delay characteristic is obtained.

In accordance with a feature of the invention, by proper tuning of the discs the degree of group delay compensation, i.e., the amount of variation of time delay over the passband frequency, can be varied over a substantial range. In other words, by varying the design of the group delay compensating section, a large family of group delay curves having the inverted U-shape, but with varying degrees of dip in the center of the passband, can be obtained to compensate fer different U-shaped delay characteristics of conventional filter sections.

The above-mentioned and other objects and features of the invention will be more fully understood from the following detailed description thereof when read in conjunction with the drawings in which.

Figure 1:
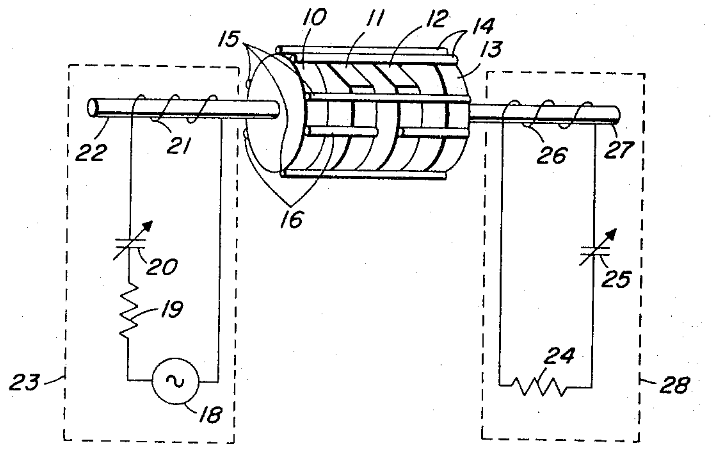
FIG. 1 is a perspective view of the group delay compensating filter section of the present invention.

Referring now to FIG. 1, the four discs 10, 11, 12, and 13 are coupled together by coupling wires 15 which run the length of the stacked disc arrangement and are fixed by suitable means. such as spot welding, to each disc. The two center discs 11 and 12 have a portion of their edges flattened, as can be seen from the drawing. Bridging wires 14 pass over such flattened portions of discs 11 and 12 and are fastened at either end to discs 10 and 13. The use of two bridging wires 14 is employed rather than a single, larger bridging wire, due to manufacturing difficulties present with the larger bridging wire.

The signal input means is contained within the dotted block 23 and the signal output means is contained within dotted block 28.

Block 23 is comprised of a signal source 18 supplied to a coil 21 through resistor 19 and variable tuning capacitor 20. The coil 21 is wound around a suitable transducing means 22 which may be magnetostrictive material and which functions to transform the electrical signal in coil 21 into mechanical vibrations, which are transmitted through driving rod 22, to disc 10. Rod 22 is securely fixed to disc 10, as by spotwelding, for example.

The vibrations which lying within the filter passband pass through the discs 10, 11, 12, and 13 from disc-to-disc in a manner generally well known, but with an important difference which forms the essence of the present invention. Such important difference is due to bridging wire 14 and the two segmented discs 11 and 12 bridged thereby.

At the output of the mechanical filter section, the mechanical vibrations in the rod 27, which can be of a magnetostrictive material, functions to induce an electrical signal in coil 26. Such electrical signal is supplied through tuning capacitor 25 to a suitable load means 24, which could be, for example, the input to an amplifier.

It is difficult, if not virtually impossible, to look at the structure of FIG. 1 and to understand intuitively why the use of the two segmented discs 11 and 12 bridged by bridging wires 14 functions to produce a group delay complementary to that of a conventional mechanical filter section. To understand why such compensatory group delay is obtained, it is necessary to employ a mathematical analysis of an equivalent electrical filter circuit. Consequently, much of the present application will be devoted to the discussion of equivalent electrical circuits of the structure of FIG. 1 and a mathematical treatment of such equivalent circuits.

Figure 3:
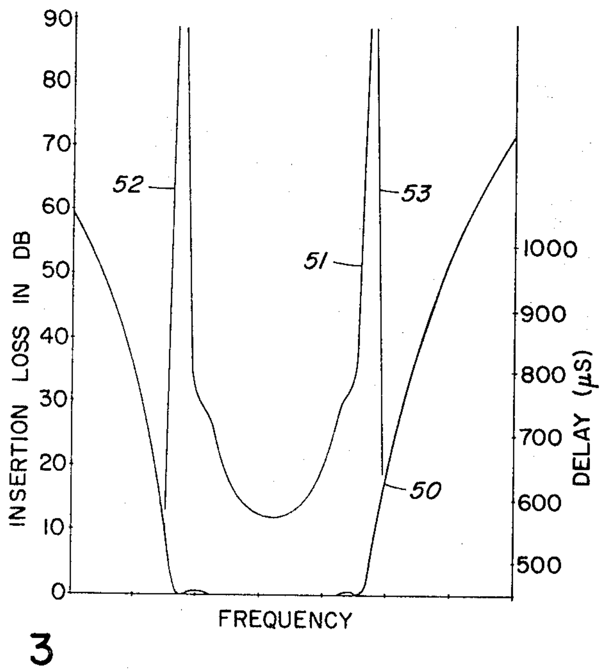
FIG. 3 is a set of waveforms or curves showing the frequency response characteristic and the group delay characteristic of a conventional type mechanical filter section.

Before beginning such mathematical treatment of the circuits, a general examination of some of the other figures will be made. More specifically, referring to FIG. 3, there is shown a curve of the frequency response and the group delay of a conventional mechanical filter. In FIG. 3 the frequency response curve is actually shown as an attenuation curve 50. As the attenuation goes to zero, the amount of signal passed through the filter increases so that the frequency response curve will be substantially a mirror image of the attenuation curve 50. The more important curve, as far as the present invention is concerned, is the group delay curve 51, which can be seen to be approximately U-shaped. The frequencies near the lower edge 52 of the passband can be seen to have a high delay, measurer in terms of microseconds, as does the frequency components near the upper edge 53. However, near the center of the passband the delay of the frequency components is considerably less.

Figure 4:
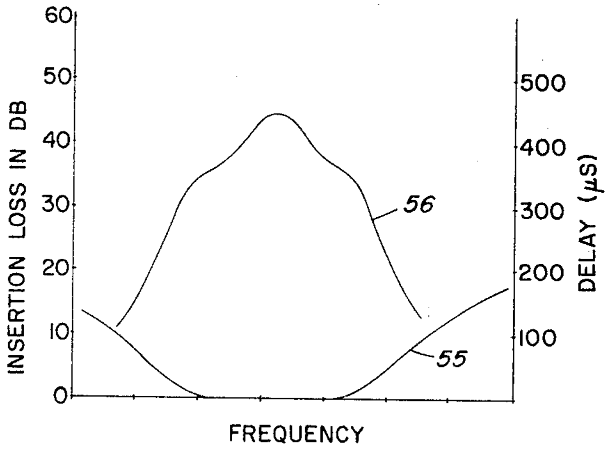
FIG. 4 is another set of characteristic curves showing the frequency response and the group delay response of the group delay compensating filter section of the present invention.

In FIG. 4 there is shown the frequency response curve 55 of the group delay compensating filter section and also the group delay characteristic curve 56 of such a filter. It can be seen that curve 56 is generally complementary to that of the group delay curve 51 of FIG. 3.

Figures 5, 6, 7:
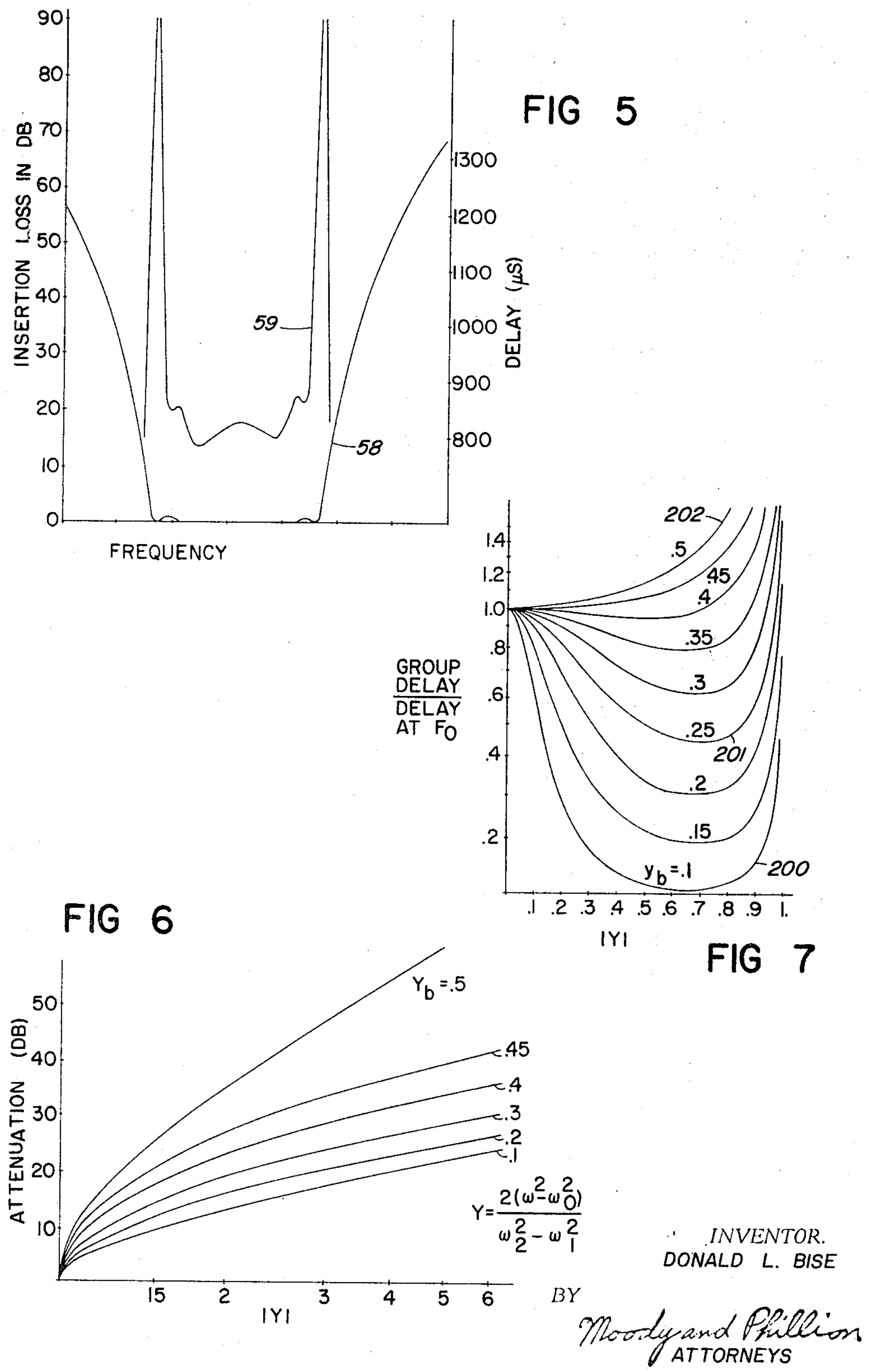
FIG. 5 is a third set of waveforms showing the resultant frequency response characteristic and the group delay response characteristic of the combination of a conventional mechanical filter section and the group delay compensatory mechanical filter section of the present invention.
FIG. 6 is a family of curves showing the attenuation characteristics in the stopband region as a function of the upper and lower cutoff frequencies and the center frequency. The X axis of FIG. 6 is expressed in terms of a variable $y$ which transforms the various frequencies into a simplified algebraic form.
FIG. 7 shows a family of curves representing the group delay of the mechanical filter of the present invention over the passband frequency.

In FIG. 5 there is shown the resultant attenuation curve 58 and the resultant group delay characteristic curve 59 obtained when structures represented by the curves of FIGS. 3 and 4 are combined into a single mechanical filter. In FIG. 5 it can be seen that the group delay line is considerably more constant in nature than the group delay characteristic of either FIG. 3 or FIG. 4.

Figure 2:
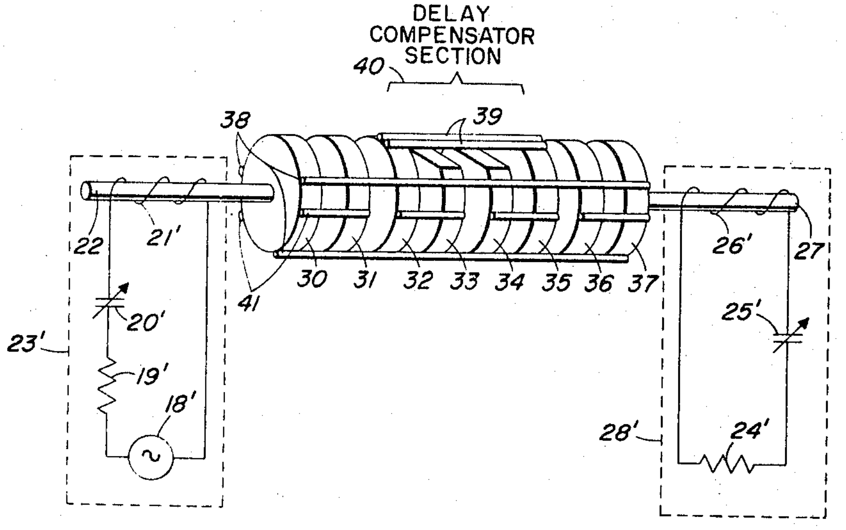
FIG. 2 is a perspective view of a complete mechanical filter comprising a conventional section with a U-shaped group delay characteristic and a group delay compensating section having an inverted U-shaped group delay characteristic.

The curves of FIG. 6 and FIG. 7 are representative generally of the mechanical filter shown in perspective in FIG. 1, which is comprised of four discs. In FIG. 2 the discs 32, 33, 34, and 35 comprise the filter section having the compensatory group delay characteristic of the present invention, and the discs 30, 31, 36, and 37 form a conventional four-disc filter section. In the structure of FIG. 2 the four discs 30, 31, 36, and 37 forming the conventional filter section are not positioned adjacent each other, but are located two each on either side of the center section of the bridged section consisting of discs 32, 33, 34, and 35. However, the overall effect is substantially the same as if the four discs forming the conventional filter had been grouped together and then coupled at one end to the four discs forming the delay compensated section 40.

Figure 8:
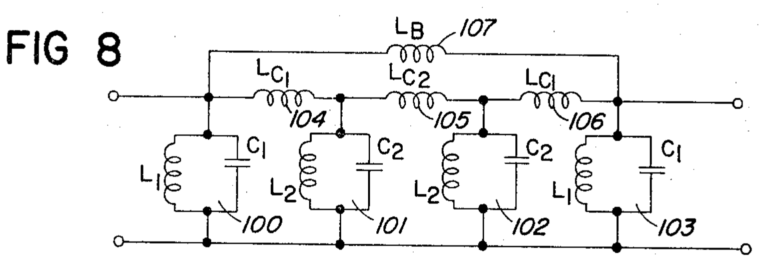
FIG. 8 shows the equivalent electrical circuit of a four-element mechanical filter with bridging wires, and having the inverted U-shaped group delay compensating characteristic.

Referring now to FIG. 8, there is shown the electrical equivalent circuit of the four disc bridged section of FIG. 1. In FIG. 8 the four tuned circuits 100, 101, 102, and 103 correspond, respectively, to the discs 10, 11, 12, and 13 of FIG. 1 and the inductors 104, 105, and 106 correspond to the coupling wires 15 and 16 of FIG. 1. It is to be noted that the portion of the coupling wire adjoining two adjacent discs is represented by a single inductance in FIG. 8. For example, the inductor 104 of FIG. 8 represents that portion of all three coupling wires 15 and coupling wires 16 joining together the discs 10 and 11.

The inductor 107 of FIG. 8 represents the bridging wires 14 of FIG. 1. Since the bridging wires 14 are not connected to the two center discs 11 and 12, inductor 14 bypasses the two circuits 101 and 102 of FIG. 8 which correspond to discs 11 and 12.

Figure 9:
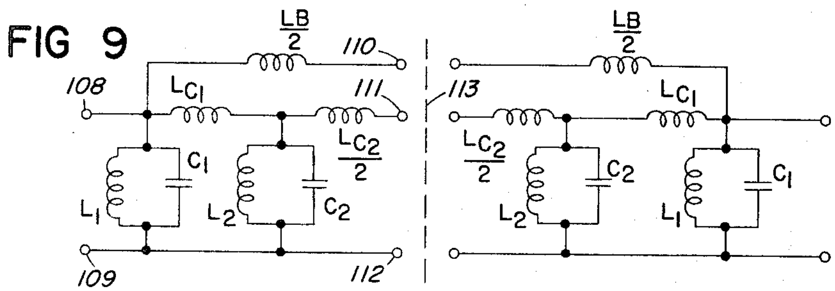
FIG. 9 is a circuit of FIG. 8 redrawn in order to apply Bartlett's network transformation theorem.

By the application of a theorem known as Bartlett's theorem, the circuit of FIG. 8 can be redrawn to form a completely symmetrical circuit as shown in FIG. 9 with the inductors $L_{c2}$ and $L_b$ being divided into two portions.

Figure 10:
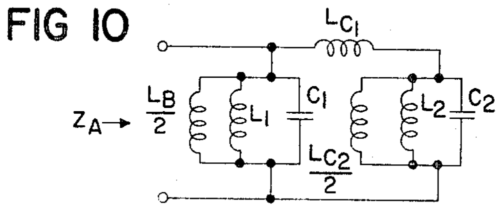
FIGS. 10 and 11 represent the short-circuited and open-circuited impedances of the left-hand half of the circuit of FIG. 9.
Figure 11:
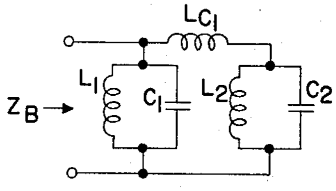
Figure 12:
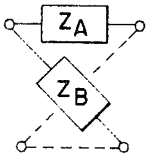
FIG. 12 shows a lattice-type network utilizing the short-circuited and open-circuited impedances shown in FIGS. 10 and 11.

In accordance with Bartlett's theorem, the ladder-type network of FIG. 9 can be converted to the lattice-type network of FIG. 12 by the following steps. The symmetrical circuit of FIG. 9 is split in the center as indicated by the dotted line 113. The impedance $Z_a$ of FIG. 12 represents the impedance obtained by shorting the terminals 110, 111, and 112 of the left-hand half of FIG. 9 and then looking into the terminals 108 and 109. Such shorted impedance $Z_a$ is shown in FIG. 10. The impedance $Z_b$ represents the impedance obtained by looking into terminals 108 and 109 of the left-hand half of FIG. 9 with the terminals 110, 111, and 112 open-circuited, as shown. Such open circuit impedance $Z_b$ is shown in FIG. 11. Then, in FIG. 12 the impedances $Z_a$ and $Z_b$ are employed to form the series and the cross-arm impedances, respectively, of the lattice-type network shown therein.

Figure 13:
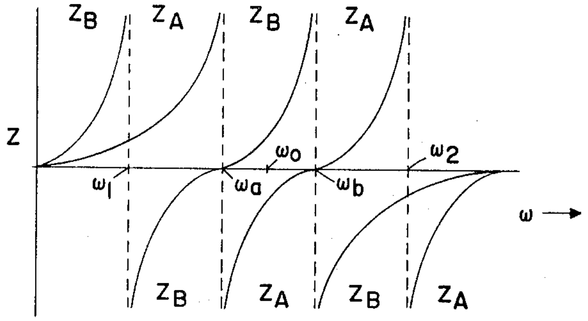
FIG. 13 is an impedance vs. frequency curve of the lattice arms of FIG. 12.

In FIG. 13 the impedance vs. frequency characteristic of the lattice arms of FIG. 12 are shown. In order to obtain a passband effect with a minimum of ripple, the poles of the two impedances $Z_b$ and $Z_a$ are made to coincide with the zero impedance crossing of the other impedance. For example, the first pole of $Z_a$ is made to occur at the zero crossing of $Z_b$. Such zero crossing is identified as frequency $\omega_a$. The pole of $Z_b$ is defined as occurring at the zero crossing of $Z_a$, which zero crossing is identified as frequency $\omega_b$. The first pole of $Z_b$ occurs at a frequency designated as $\omega_1$, which is the lower cutoff frequency of the passband. Similarly, the upper cutoff frequency of the passband $\omega_2$ occurs at the pole of impedance $Z_a$. The center frequency of the passband is defined as $\omega_0$.

It is to be noted that the use of the lattice-type structure of FIG. 12 rather than the circuit of FIG. 8, is employed since an analytical treatment of the lattice-type circuit of FIG. 12 is simpler than an analytical treatment of the circuit of FIG. 8, and facilitates what is known as an image parameter design and analysis.

From FIG. 12 and the curves of FIG. 13 the expressions for $Z_a$ and $Z_b$ can be determined to be as follows:

$$Z_a(S)=\frac{-j\omega(\omega^2-\omega_b^2}{C_1(\omega^2-\omega_a^2)(\omega^2-\omega_2^2)} \qquad (1)$$

$$Z_b(S)=\frac{-j\omega(\omega^2-\omega_a^2)}{C_1(\omega^2-\omega_1^2)(\omega^2-\omega_b^2)} \qquad (2)$$

where $C_1$ represents the resonator equivalent mass, as shown in FIG. 8.

The image parameters $Z_0$ and $Y_I$ are found to be as follows:

$$Z_0(j\omega)=\pm\sqrt{Z_AZ_B}=\pm\frac{j\omega}{C_1}\sqrt{\frac{1}{\omega^4-(\omega_1^2+\omega_2^2)\omega^2+\omega_1^2\omega_2^2}} \qquad (3)$$

$$Y_I(j\omega)=\sqrt{\frac{(\omega^2-\omega_a^2)^2(\omega^2-\omega_2^2)}{(\omega^2-\omega_1^2)(\omega^2-\omega_b^2)^2}} \qquad (4)$$

where $Z_0$ is the image impedance and $Y_I$ is the index function.

Using Expressions 1 through 4, the analytical treatment of the circuit of FIG. 12 can become quite lengthy. In order to simplify the algebra somewhat certain transformations will now be introduced into the analysis. These transformations which will follow, function generally to simplify the algebra in that the axes of the curves representing the various characteristics are changed so that the center frequency $\omega_0$ will fall at zero and the upper and lower limits of the passband $\omega_1$ and $\omega_2$ will fall at a minus 1 and plus 1, respectively, on the X axis.

To effect such change the following transformations are needed:

$$y=\frac{2(\omega^2-\omega_0^2)}{\omega_2^2-\omega_1^2} \qquad (5)$$

$$\omega_0=\sqrt{\frac{\omega_1^2+\omega_2^2}{2}} \qquad (6)$$

where $\omega$ is a variable and can be $\omega_a$ or $\omega_b$, in which case $y$ would be $y_a$ or $y_b$.

In writing Expression 4 in terms of the $y$ variable of Expression 5 we have $$Y_I=\sqrt{\frac{(y-1)(y-y_a)^2}{(y+1)(y-y_b)^2}} \qquad (7)$$

It can be shown in the synthesis of arms $Z_a$ and $Z_b$ that $y_a=y_b$ for the coupling inductors $L_{c1}$ (see FIG. 8) in both arms to be equal. Using this relationship, Expression 7 may be rewritten as follows:

$$Y_I=\sqrt{\frac{(y-1)(y+y_b)^2}{(y+1)(y-y_b)^2}} \qquad (8)$$

The attenuation can then be expressed in the following manner:

$$A(db)=20\log_{10}\left|\frac{1+\sqrt{\frac{(y-1)(y+y_b)^2}{(y+1)(y-y_b)^2}}}{1-\sqrt{\frac{(y-1)(y+y_b)^2}{(y+1)(y-y_b)^2}}}\right| \qquad (9)$$

And the phase shift can be expressed:

$$\theta(y)=2\tan^{-1}\sqrt{\frac{(1-y)(y+y_b)^2}{(1+y)(y-y_b)^2}} \qquad (10)$$

The group delay of the circuit is then determined in the following manner. Such group delay is defined, generally, as the rate of change of phase with respect to $\omega$, which may be expressed in the following manner:

$$t_g=\frac{d\theta(\omega)}{d\omega}=\frac{dy}{d\omega}\cdot\frac{d\theta(y)}{dy} \qquad (11)$$

By differentiating the Expression 10 the following expression is obtained:

$$\theta'(y)=\frac{(1-2y_b)y^2+2y_b-y_b^2}{[(1-2y_b)y^2+y_b^2]\sqrt{1-y^2}} \qquad (12)$$

However, Expression 12 is a differential of the phase ($\theta$) with respect to Y; whereas, the group delay $t_g$ is defined by Expression 11 as $d\theta/d\omega$. To obtain $d\theta/d\omega$ it is necessary to multiply Expression 12 by $dy/d\omega$, as indicated in Expression 11. The quantity $dy/d\omega$ is obtained by taking the derivative of Expression 5 with the following results:

$$\frac{dy}{d\omega}=\frac{4\omega}{\omega_2^2-\omega_1^2} \qquad (13)$$

multiplying Expression 12 by Expression 13 we obtain:

$$t_g=t_{g0}\frac{y_b[(1-2y_b)y^2+2y_b-y_b^2]}{(2-y_b)[(1-2y_b)y^2+y_b^2]\sqrt{1-y^2}} \qquad (14)$$

where $t_{g0}$ is equal to $$t_{g0}\cong\frac{2}{B}\left(\frac{2-y_b}{y_b}\right) \qquad (15)$$

with $$B=\omega_2-\omega_1 \qquad (16)$$

Returning again to Expression 14, the ratio of $t_g/t_{g0}$ is plotted against Y in FIG. 7. As will be recalled, however, $y$ is a variable which is a function of frequency as set forth in Expression 5. Therefore, the curves of FIG. 7 can be seen to represent the group delay over the delay at the center frequency $\omega_0$ plotted as a function of the normalized variable $y$.

Element values of FIG. 8 can be found by synthesizing the lattice arms of FIG. 10 and are given by:

$$C_1=\frac{1}{R_0(\omega_2-\omega_1)} \qquad (17)$$

$$C_2=Zr^2C_1 \qquad (18)$$

$$L_1=\frac{2R_0}{(\omega_1+\omega_2)(2y_b+F-1-2r\sigma)} \qquad (19)$$

$$L_2=\frac{R_0}{(\omega_1+\omega_2)r[r(F-y_b)-\sigma]} \qquad (20)$$

$$L_{c1}=\frac{R_0}{(\omega_1+\omega_2)r\sigma} \qquad (21)$$

$$L_{c2}=\frac{R_0}{(\omega_1+\omega_2)r^2y_b} \qquad (22)$$

$$L_b=\frac{2R_0}{(\omega_1+\omega_2)(1-2y_b)} \qquad (23)$$

where $$r=\sqrt{\frac{C_2}{2C_1}} \qquad (24)$$

$$\sigma=\sqrt{y_b-y_b^2} \qquad (25)$$

$$F=\frac{\omega_1^2+\omega_2^2}{\omega_2^2-\omega_1^2} \qquad (26)$$

and $R_0$ is the design impedance of the section.

From the curves of FIG. 7 it can be seen that the largest degree of group delay compensation is obtained as $y_b$ approaches zero. As $y_b$ approaches one-half, the dip in the group delay curve becomes increasingly less, and at $y_b=\frac{1}{2}$ there is no appreciable dip remaining so that no group delay compensation is thereafter effected.

Figure 14:
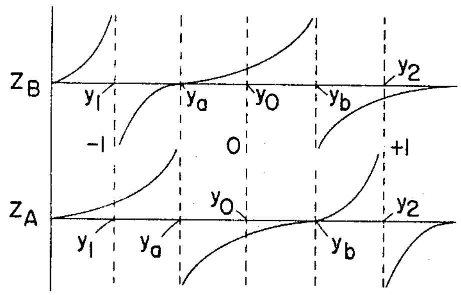
FIG. 14 is a set of impedance vs. frequency curves for the two impedances of the circuit of FIG. 12 in terms of a variable $y$ a normalized frequency indicator.

As an illustration of how the transformation from the $\omega$ variable to the $y$ variable operates, reference is made to the following Expressions 27 through 31 and to the curves of FIG. 14.

$$y_1=\frac{2(\omega_1^2-\omega_0^2)}{\omega_2^2-\omega_1^2} \tag{27}$$

Expression 27 is the expression for $y_1$ and is obtained by substituting $\omega_1$ for $\omega$ in Expression 5. Substituting the falue of $\omega_0$ as shown in Expression 6 into Expression 27 the following expression is obtained:

$$y_1=\frac{2\omega_1^2-\omega_1^2-\omega_2^2}{\omega_2^2-\omega_1^2}=\frac{\omega_1^2-\omega_2^2}{\omega_2^2-\omega_1^2}=-1 \tag{28}$$

It can be seen that $y_1$ is equal to a $-1$, as indicated in the curve of FIG. 14. Similarly, by substituting $\omega_2$ for $\omega$ in Expression 5, Expression 29 is obtained, which when expanded, is as follows:

$$y_2=\frac{2(\omega_2^2-\omega_0^2)}{\omega_2^2-\omega_1^2} \tag{29}$$

Expanding Expression 29 by substituting the value of $\omega_0$ therein, the following expression is obtained:

$$y_2=\frac{\omega_2^2-\omega_1^2}{\omega_2^2-\omega_1^2}=+1 \tag{30}$$

It can be seen that $y_2$ is equal to $+1$, as shown in FIG. 14.

The third major value of $y$ is $y_0$ which corresponds to the $\omega_0$, or the center frequency of the passband. Substituting $\omega_0$ for $\omega$ in Expression 5 there is obtained the following expression:

$$y_0=\frac{2(\omega_0^2-\omega_0^2)}{\omega_2^2-\omega_1^2}=0 \tag{31}$$

It can be seen that $y_0$ is equal to zero, as indicated in FIG. 14.

Thus the passband has been expressed in terms of a variable $y$ which has as its lower limit a $-1$ and as its upper limit a $+1$, with the center frequency being equal to zero, in terms of the $y$ variable. The values of $Z_b$ and $Z_a$ have thus been normalized in terms of a new variable $y$.

By selecting values of $y_b$ and then substituting into Expression 14, there is obtained a family of curves of group delay for various values of $y_b$. Such a family of curves is represented in FIG. 7 with the difference that the curves of FIG. 7 represent $t_g/t_{g0}$. However, the shape of the curves and the meanings thereof are identical as if $t_g$ had been plotted.

As discussed before, as $y_b$ approaches zero, the group delay curves of FIG. 7 acquire more of a dip. For example, if $y_b$ is made equal to 0.1 the resultant curve 200 dips at its lowest point to a group delay value of almost .1. On the other hand, if $y_b$ is made equal to .25 the resultant curve 201 dips to a value of approximately .45. If the value of $y_b$ is increased to .5, the resultant curve 202 has no appreciable dip and could not be used as a group delay compensating filter section.

It is to be understood that the form of the invention shown and described herein is but a preferred embodiment thereof and that various changes may be made in structural parameters and corresponding equivalent circuit parameters without departing from the spirit or scope of the invention.

I claim:

1. A mechanical filter section having an inverted U-shaped group delay characteristic and comprising:
- first, second, third, and fourth circular mode discs arranged in a stacked relation in the order named with their axes lying along a common line and spaced apart a distance less than a half wavelength of their natural resonant frequency;
- a plurality of wire-like coupling means extending along said stack of discs and secured to the perimeters of said discs to hold the discs in their relative positions;

- said second and third discs having segments thereof removed from their perimeters;
- wire-like bridging means secured to the perimeters of said first disc and said fourth disc and passing across the segmented portions of said second and third discs;
- said mechanical filter section having a group delay in accordance with the expression:

$$t_g=t_{g0}\frac{y_b[(1-2y_b)y^2+2y_b-y_b^2]}{(2-y_b)[(1-2y_b)y^2+y_b^2]\sqrt{1-y^2}}$$

where $t_g$ is the group phase delay, $t_{g0}$ is the phase delay at the pass-band center frequency, $y$ and $y_b$ are as defined in the specification, and where $0<y_b<1/2$.

2. A mechanical filter section in accordance with claim 1 in combination with a second mechanical filter section having a U-shaped group delay characteristic and comprising:
- a plurality of discs arranged in a stacked relation with their axes lying along said common line and spaced apart from adjacent discs a distance less than a half wavelength of their natural resonant frequency;
- said plurality of discs being held securely in position by said wire-like coupling means which are secured to the perimeters of the discs of said plurality of discs.

3. A mechanical filter section in combination with said second mechanical filter section in accordance with claim 2 comprising:
- input means comprising a first rod of magnetostrictive material securely affixed to the center of a first end disc of said mechanical filter combination, and energizing coil means wound on said first rod;
- and output means comprising a second rod of magnetostrictive material securely affixed to the center of the other end disc of said mechanical filter combination, and detecting coil means wound on said second rod.

4. A mechanical filter section in combination with said second mechanical filter section in accordance with claim 1 comprising:
- input means comprising a first rod of magnetostrictive material securely affixed to the center of a first end disc of said mechanical filter combination, and energerizing coil means wound on said first rod;
- and output means comprising a second rod of magnetostrictive material securely affixed to the center of the other end disc of said mechanical filter combination, and detecting coil means wound on said second rod.

5. A mechanical filter section having an inverted U-shaped group delay characteristic and comprising:
- first, second, third, and fourth circular mode discs arranged in a stacked relation in the order named, with their axes lying along a common line and spaced apart a distance less than a half wavelength of their natural resonant frequency;
- a plurality of wire-like coupling means extending along said stack of discs and secured to the perimeters of said discs to hold said discs in their relative positions;
- said second and third discs having segments thereof removed from their perimeters;
- wire-like bridging means secured to the perimeters of said first disc and said fourth disc and passing across the segmented portions of said second and third discs;
- the said mechanical filter being designed to have $0<y_b<1/2$ in the expression $$y_b=\frac{2(\omega_b-\omega_0^2)}{\omega_2^2-\omega_1^2}$$

as defined in the specification.

6. A mechanical filter section in accordance with claim 5 in combination with a second mechanical filter section having a U-shaped group delay characteristic and comprising:
- a plurality of discs arranged in a stacked relation with their axes lying along said common line and spaced apart from adjacent discs a distance less than half a wavelength of their natural resonant frequency;

said plurality of discs being held securely in position by said wire-like coupling means which are secured to the perimeters of the discs of said plurality of discs.

7. A mechanical filter section in combination with said second mechanical filter section in accordance with claim 6 comprising:

input means comprising a first rod of magnetostrictive material securely affixed to the center of a first end disc of said mechanical filter combination, and energizing coil means wound on said first rod;

and output means, comprising a second rod of magnetostrictive material securely affixed to the center of the other end disc of said mechanical filter combination, and detecting coil means wound on said second rod.

8. A mechanical filter section in combination with said second mechanical filter section in accordance with claim 5 comprising:

input means comprising a first rod of magnetostrictive material securely affixed to the center of a first end disc of said mechanical filter combination, and energizing coil means wound on said first rod;

and output means comprising a second rod of magnetostrictive material securely affixed to the center of the other end disc of said mechanical filter combination, and detecting coil means wound on said second rod.

9. A mechanical filter section having an inverted U-shaped group delay characteristic and comprising:

first, second, third, and fourth circular mode discs arranged in a stacked relation in the order named, with their axes lying along a common line and spaced apart a distance less than a half wavelength of their natural resonant frequency;

a plurality of wire-like coupling means extending along said stack of discs and secured to the perimeters of said discs to hold the discs in their relative positions;

said second and third discs having segments thereof removed from their perimeters;

wire-like bridging means secured to the perimeters of said first disc and said fourth disc and passing across the segmented portions of said second and third discs;

said discs being cut to have their natural resonant frequencies bear a relation to each other, and said wire-like coupling means and said wire-like bridging means having mechanical impedances to produce an inverted U-shaped group delay characteristic.

10. A mechanical filter section in accordance with claim 9 in combination with a second mechanical filter section having a U-shaped group delay charactertistic and comprising:

a plurality of discs arranged in a stacked relation with their axes lying along said common line and spaced apart with adjacent discs a distance less than a half wavelength of their natural resonant frequency;

said plurality of discs being held securely in position by said wire-like coupling means which are secured to the perimeters of the discs of said plurality of discs.

11. A mechanical filter section in combination with said second mechanical filter section in accordance with claim 10 comprising:

input means comprising a first rod of magnetostrictive material securely affixed to the center of a first end disc of said mechanical filter combination, and energizing coil means wound on said first rod;

and output means comprising a second rod of magnetostrictive material securely affixed to the center of the other end disc of said mechanical filter combination, and detecting coil means wound on said second rod.

12. A mechanical filter section having an inverted U-shaped group delay characteristic and comprising:

first, second, third, and fourth circular mode discs arranged in a stacked relation in the order named with their axes lying along a common line and spaced apart a distance less than a half wavelength of their natural resonant frequency;

a plurality of wire-like coupling means extending along said stack of discs and secured to the perimeters of said discs to hold the discs in their relative positions;

said second and third discs having segments thereof removed from their perimeters;

wire-like bridging means secured to the perimeters of said first disc and said fourth disc and passing across the segmented portions of said second and third discs.

13. A mechanical filter section in accordance with claim 12 in combination with a second mechanical filter section having a U-shaped group delay characteristic and comprising:

a plurality of discs arranged in a stacked relation with their axes lying along said common line and spaced apart from adjacent discs a distance less than a half wavelength of their natural resonant frequency;

said plurality of discs being held securely in position by said wire-like coupling means which are secured to the perimeters of the discs of said plurality of discs.

References Cited

UNITED STATES PATENTS 3,135,933 6/1964 Johnson ----------- 333—72 X

JOHN KOMINSKI, *Primary Examiner.*

L. J. DAHL, *Assistant Examiner.*

U.S. Cl. X.R.

333—71, 72